US010559799B2

(12) United States Patent
Lanciotti et al.

(10) Patent No.: US 10,559,799 B2
(45) Date of Patent: Feb. 11, 2020

(54) CUTTING METHOD

(71) Applicant: MANZ ITALY S.R.L., Sasso Marconi, Bologna (IT)

(72) Inventors: Claudio Lanciotti, Sasso Marconi (IT); Marco Liberati, Modena (IT); Massimiliano Sale, Sasso Marconi (IT); Marco Vivarelli, Casalecchio di Reno (IT)

(73) Assignee: MANZ ITALY S.R.L., Sasso Marconi (IT)

( * ) Notice: Subject to any disclaimer, the term of this patent is extended or adjusted under 35 U.S.C. 154(b) by 137 days.

(21) Appl. No.: 15/116,190

(22) PCT Filed: Dec. 29, 2014

(86) PCT No.: PCT/IB2014/067379
§ 371 (c)(1),
(2) Date: Aug. 2, 2016

(87) PCT Pub. No.: WO2015/124971
PCT Pub. Date: Aug. 27, 2015

(65) Prior Publication Data
US 2017/0012262 A1 Jan. 12, 2017

(30) Foreign Application Priority Data
Feb. 19, 2014 (IT) .............................. MO2014A0039

(51) Int. Cl.
*H01M 2/14* (2006.01)
*B23K 26/08* (2014.01)
(Continued)

(52) U.S. Cl.
CPC ......... *H01M 2/145* (2013.01); *B23K 26/0846* (2013.01); *B23K 26/38* (2013.01);
(Continued)

(58) Field of Classification Search
CPC H01M 2/14–185; B23K 26/38; B23K 26/402
(Continued)

(56) References Cited

U.S. PATENT DOCUMENTS 4,266,112 A 5/1981 Miedermeyer
2004/0026384 A1* 2/2004 Mueller ............. B23K 26/0846
219/121.7
(Continued)

FOREIGN PATENT DOCUMENTS

DE 102010053341 A1 * 6/2012
EP 1 447 068 A1 8/2004
(Continued)

OTHER PUBLICATIONS

Machine translation of DE102010053341 date unknown.*
(Continued)

*Primary Examiner* — John L Goff, II
(74) *Attorney, Agent, or Firm* — Maschoff Brennan

(57) ABSTRACT

A cutting method is disclosed for cutting a continuous separator sheet material in a cutting zone comprised between two non-rectangular electrodes using a laser arrangement of solid state type, executing on the material a first cutting line that is then intersected by a second cutting line at an intersection point located in an intermediate portion of the first cutting line, with an intersection direction that is perpendicular to the first cutting line at the intersection point.

11 Claims, 3 Drawing Sheets

(51) Int. Cl.
  *B23K 26/38* (2014.01)
  *H01M 2/18* (2006.01)
  *B23K 26/402* (2014.01)
  *H01M 2/16* (2006.01)
  *B23K 103/00* (2006.01)

(52) U.S. Cl.
  CPC ........... *B23K 26/402* (2013.01); *H01M 2/166* (2013.01); *H01M 2/168* (2013.01); *H01M 2/18* (2013.01); *B23K 2103/42* (2018.08)

(58) Field of Classification Search
  USPC .......................... 156/259, 269; 429/129–147
  See application file for complete search history.

(56) References Cited

U.S. PATENT DOCUMENTS

| | | | | |
|---|---|---|---|---|
| 2011/0146064 A1* | 6/2011 | Feaver | ................ | H01M 2/1673 29/623.2 |
| 2012/0315523 A1* | 12/2012 | Pozin | ...................... | H01M 4/06 429/94 |
| 2012/0321932 A1* | 12/2012 | Ise | ...................... | H01M 2/1673 429/144 |
| 2013/0108906 A1* | 5/2013 | Bhardwaj | ......... | H01M 10/0431 429/94 |
| 2014/0050959 A1 | 2/2014 | Ryu et al. | | |
| 2014/0106206 A1 | 4/2014 | Kwon et al. | | |
| 2014/0272543 A1* | 9/2014 | Devan | ............... | H01M 10/0436 429/162 |

FOREIGN PATENT DOCUMENTS

| | | | |
|---|---|---|---|
| JP | 02056856 A | * | 2/1990 |
| JP | 2013-119095 A | | 6/2013 |
| KR | 20130133639 A | | 12/2013 |
| WO | 2013/180378 A1 | | 3/2013 |

OTHER PUBLICATIONS

Machien translation of JP 2013119095 date unknown.*
Machine translation of JP 02056856 date unknown.*
EP Office Action in Application No. 14 836 976.2 dated Jun. 17, 2019.

* cited by examiner

CUTTING METHOD

This application is a national phase of PCT International Application No. PCT/IB2014/067379 filed Dec. 29, 2014. PCT/IB2014/067379 claims priority to IT Application No. MO2014A000039 filed Feb. 19, 2014. The entire contents of these applications are incorporated herein by reference.

BACKGROUND OF THE INVENTION

The invention relates to a cutting method, in particular for cutting a sheet material that is usable as a separator for electrodes in an electric energy storage device, for example, a battery or a storage unit.

Specifically, but not exclusively, the invention can be used to form elements (cells) of non-rectangular shape intended to be part of an electric energy storage device.

Forming an arrangement of electrodes in a row one after the other at a certain space from one another applied to at least one sheet material of a separator, and then cutting the sheet material in the spaces comprised between the electrodes for producing cells intended for producing an electric energy storage device.

Patent publication JP 2013119095A shows a solid state laser cutting apparatus for cutting the sheet of a separator of a secondary electrolytic battery by a straight cutting line executed in the space between two rectangular electrodes.

SUMMARY OF THE INVENTION

One object of the invention is to provide a cutting method and/or apparatus for cutting the separator sheet material comprised between two electrodes.

One advantage is enabling a non-straight cut to be made that is precise and effective.

One advantage is to enable high quality cells to be made with electrodes of non-rectangular shape.

One advantage is to obtain a clean and clear cut, in particular without wires or fragments of material that by remaining attached to a cut edge can make the cut imperfect and unable to detach the cut edges completely.

One advantage is to avoid excessive deformation or other damage to the material, in particular along the cut edge.

One advantage is to permit fast and efficient cutting.

One advantage is to provide a cheap and simple method and/or apparatus.

Such objects and advantages, and still others, are achieved by the method and/or apparatus according to one or more of the claims set out below.

In one example, a cutting method comprises the step of providing an arrangement of non-rectangular electrodes arranged in a row on a separator sheet material, and the subsequent step of cutting the sheet material by executing a first cutting line with at least one movable laser beam, this first cutting line being then intersected by a second cutting line made with at least one movable beam according to an intersection direction that is transverse to the edge cut by the first cutting line at the intersection point.

BRIEF DESCRIPTION OF THE DRAWINGS

The invention can be better understood and actuated with reference to the attached drawings that illustrate one embodiment thereof by way of non-limiting example.

DETAILED DESCRIPTION

With reference to the aforesaid figures, with 1 overall an arrangement of a plurality of electrodes E applied to a continuous sheet material S of a separator for electrodes has been indicated. The electrodes E may be arranged, as in this embodiment, in a row one after the other aligned in a longitudinal direction, leaving a certain space (for example constant) between one electrode and another. Cutting the sheet material S in the space comprised between each pair of consecutive electrodes E of the row may thus be permitted.

Figure 1:
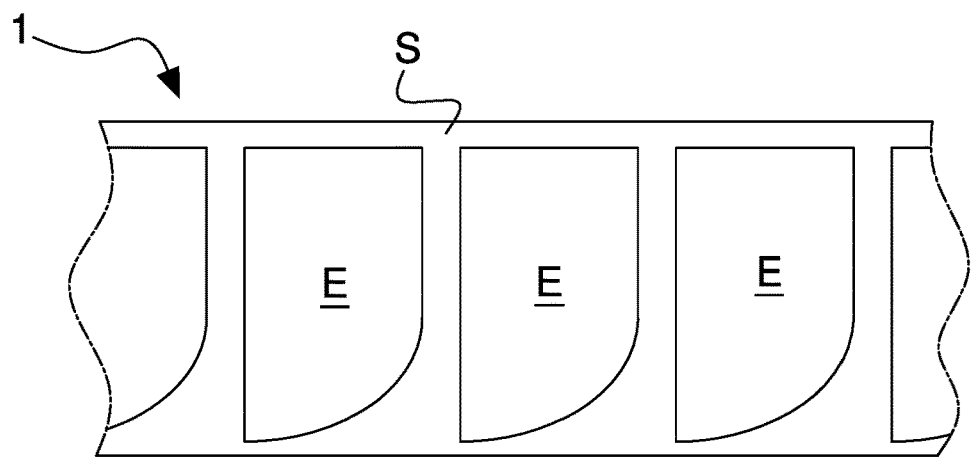
FIG. 1 is a top plan view of an arrangement of electrodes with a continuous separator sheet material.
Figure 2:
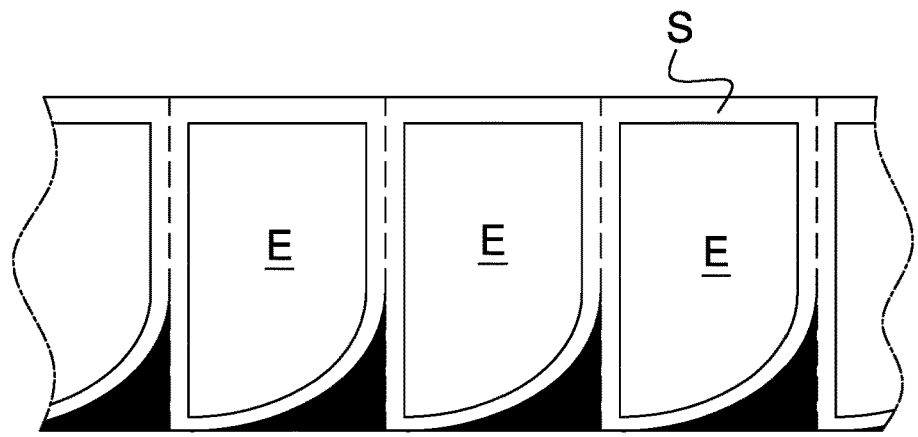
FIG. 2 is the view of FIG. 1 in which the zones of the separator sheet that are intended for cutting and rejection are shown schematically.
Figure 3:
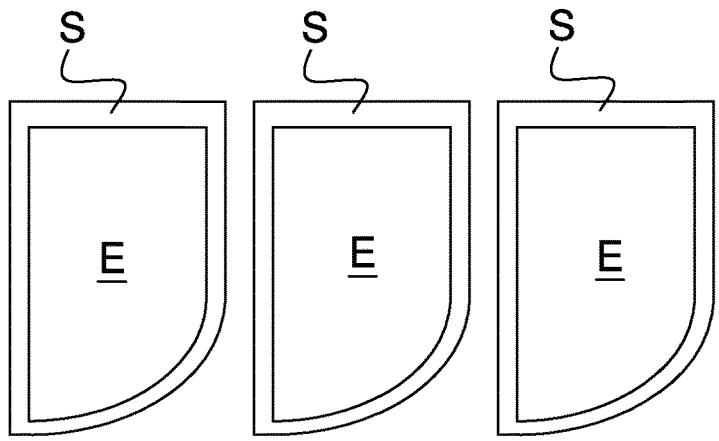
FIG. 3 shows in a schematic manner the single cells obtained after the aforesaid zones shown in FIG. 2 have been cut and eliminated.

In FIG. 2 dashed lines represent the cutting lines (which are transverse to the aforesaid longitudinal direction) between the pairs of consecutive electrodes, whereas continuous lines represent the areas of material intended for rejection. In FIG. 3 the cells are shown after cutting and elimination of the offcuts.

Figure 9:
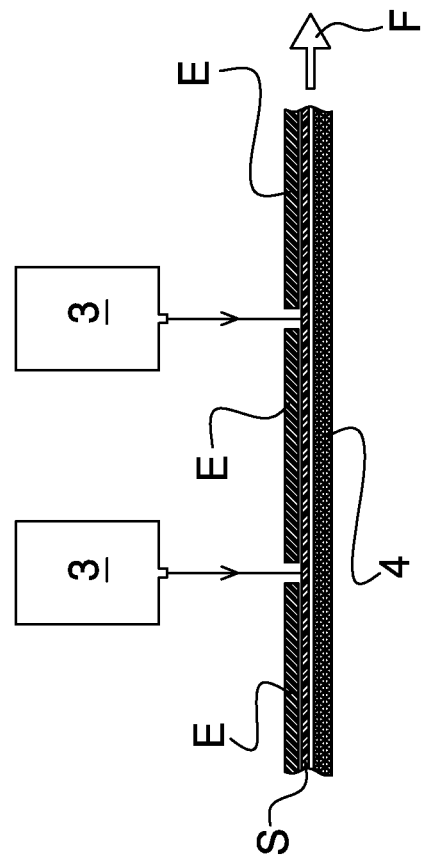
FIG. 9 is a schematic view in a vertical elevation of one example of a cutting apparatus for implementing the aforesaid method.
Figure 6:
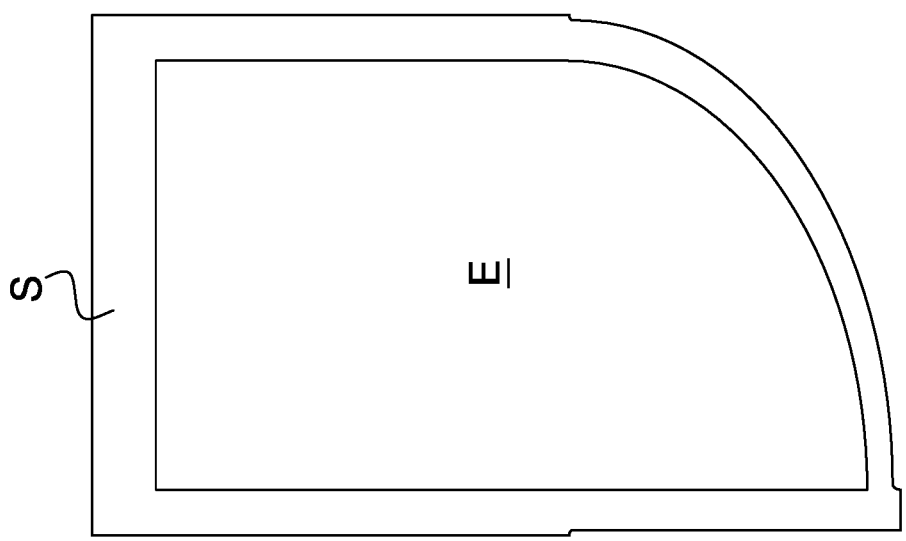
FIG. 6 shows a cell obtained with the aforesaid cutting method.

The sheet material S may comprise a web extending continuously along the aforesaid longitudinal direction. The arrangement 1 of electrodes may be made in a known manner and not disclosed here. In particular the arrangement 1 of electrodes may be conveyed in an advancement direction F parallel to the aforesaid longitudinal direction (FIG. 9). The sheet material S may be bounded laterally by a first longitudinal side (for example right side) and by a second longitudinal side (for example left side) opposite the first longitudinal side. The two opposite longitudinal sides may be straight.

The electrodes E arranged on the sheet material S may comprise, as in this embodiment, electrodes of non-rectangular shape. In the attached figures a specific example of a non-rectangular electrode is shown. It is nevertheless possible to provide a multiplicity of different shapes of electrode (in particular non-rectangular).

The electrodes E may be applied to the sheet material S so as to be attached thereto. In particular, it is possible to provide a step of coupling the electrodes E with the sheet material S by lamination (in a known manner). This lamination step may precede the step of cutting the material S.

In particular, a cutting method is disclosed comprising the step of cutting with a laser arrangement, in particular with a laser arrangement of solid state type, the sheet material S of a separator for electrodes. The cut may be made, in particular, in the space between two consecutive electrodes E. The laser arrangement is arranged for emitting at least one laser beam that is able to perform at least one cutting movement with at least one non-straight movement part. The cut may be used, as in this embodiment, to form single cells intended to produce an electric energy storage device.

Figure 5:
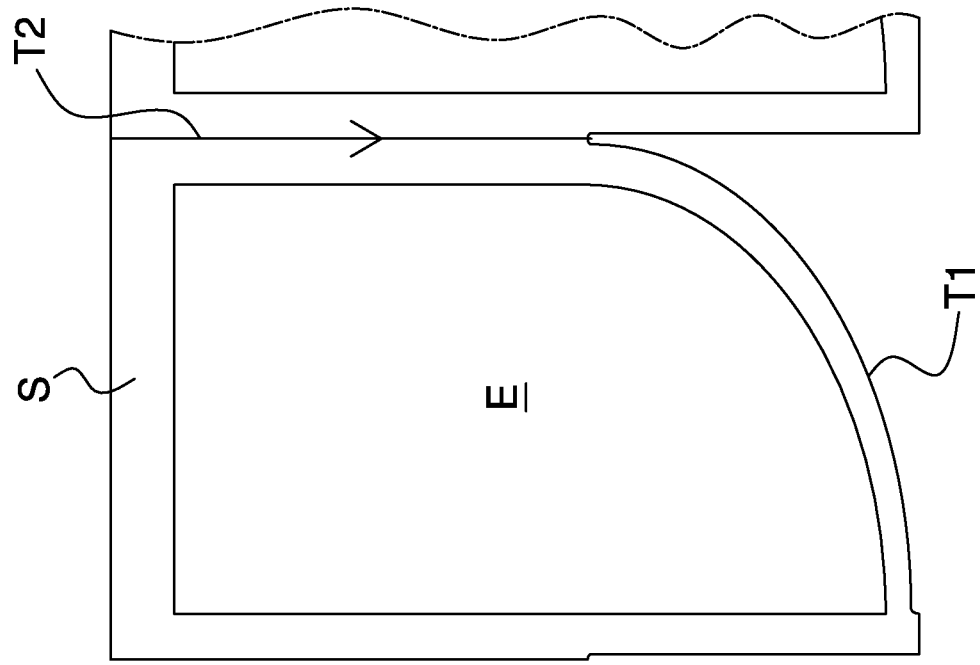
FIG. 5 shows a second step of the aforesaid cutting method.
Figure 4:
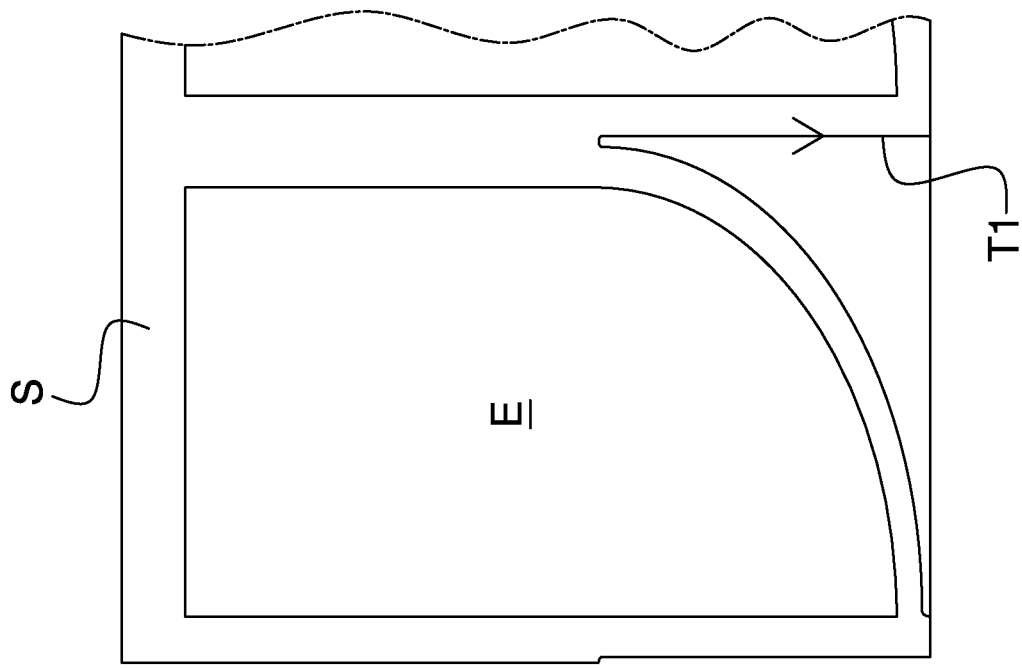
FIG. 4 shows a first step of a cutting method executed according to one embodiment of the invention.
Figure 8:
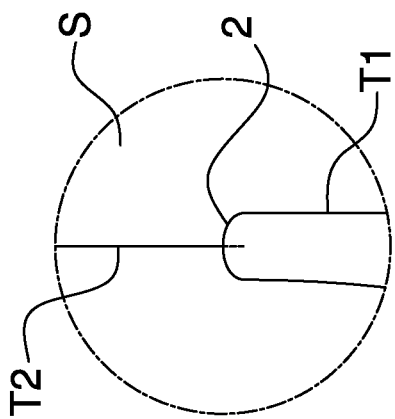
FIG. 8 is an enlarged detail of FIG. 5.
Figure 7:
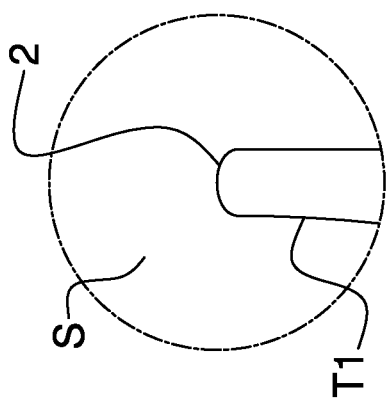
FIG. 7 is an enlarged detail of FIG. 4.

In particular, the sheet material S of a separator for electrodes may be cut along at least two distinct cutting lines in which a first cutting line T1 is intersected by a second cutting line T2 with an intersecting direction that is transverse to the first cutting line T1 at the intersection point. The laser arrangement may comprise an arrangement for emitting at least two laser beams that are able to perform cutting movements corresponding to the aforesaid cutting lines T1 and T2. In FIGS. 4 and 5 the execution directions of the two cutting lines T1 and T2 have been indicated with arrows. The cut may also be executed in the direction opposite the direction indicated by the arrows.

The aforesaid intersection direction may be, as in this case, perpendicular to the first cutting line T1 at the intersection point.

The second cutting line T2 may be executed, as in the example, after the first cutting line T1 (at least at the intersection point). The intersection point may be, in particular, an intermediate point of the first cutting line T1. Both the aforesaid cutting lines T1 and T2 may be executed in the zone comprised between two non-rectangular electrodes E applied to the continuous sheet material S. The second cutting line T2 may continue beyond the intersection point (for example by a few millimetres or by a few tenths of a millimetre) with the first cutting line T1 (with the line T2 executed after the line T1 or, vice versa, with the line T2 which is executed before the line T1 and which continues beyond the point intended for the intersection) to ensure the detachment of the material at the intersection point (so as to separate the sheet into two distinct parts).

The sheet material S may comprise, for example, two, three or more superimposed films. The electrodes E may be, for example, laminated between two superimposed films of separator material. It is possible that after lamination in the cutting zone an air gap forms that is comprised between the two superimposed films. The cutting step may comprise (simultaneous) cutting of the two superimposed films in the cutting zone where the air gap has formed. Solid state type laser cutting enables a clear and precise cut to be made even in the presence of an air gap.

Executing of the first cutting line T1 may start and/or end on the first side of the sheet material S. The start and/or end of the first cutting line T1 may be, as in this embodiment, transverse (perpendicular) to the side of the sheet material S. The second cutting line T2 may be executed between the second side of the sheet material S and an intermediate point of the first cutting line T1, for example starting in the second side of the sheet material S and ending at the intermediate point of the first cutting line T1.

The first cutting line T1 may comprise at least one intermediate portion 2 provided with at least one component parallel to the aforesaid longitudinal direction. The intersection point may be arranged, in particular, in this intermediate portion 2.

In particular, the intermediate portion 2 may comprise a curve shaped such as to have, in at least one point, a tangent that is parallel to the aforesaid longitudinal direction. In the specific case the first cutting line T1 comprises one intermediate portion 2 in the form of a half-ellipse, but many other forms are possible (for example semicircular, or knurled, or zigzagged, etc); in addition to curved shapes it is possible to provide a rectilinear intermediate portion (in particular parallel to the aforesaid longitudinal direction) of the first cutting line T1.

The sheet material S may comprise, for example, one or more layers of polymer sheets (for example microporous polymer sheets) comprising combinations of polymers chosen from a group consisting of: polypropylene (PP), polyethylene (PE), polyvinylidene difluoride (PVDF), polyether ether ketone (PEEK). These layers of (microporous) polymer sheets could, in particular, be loaded with inorganic particles. These inorganic particles could be chosen, for example, from a group consisting of: aluminium oxide ($Al_2O_3$), silicon ($SiO_2$), titanium dioxide ($TiO_2$), calcium carbonate ($CaCO_3$). The sheet material S may have, for example, a thickness comprised between 12 and 30 micron.

In FIG. 9 an apparatus for implementing the method disclosed above is disclosed schematically. The apparatus may comprise at least one laser source 3 (in particular one solid state laser source) that is able to emit at least one laser beam that hits the separator sheet material S and is movable in one cutting direction to execute the aforesaid cutting lines T1 and T2. It is possible to provide a laser arrangement that is able to generate several laser beams (for example a first beam for the first cutting line T1 and a second beam for the second cutting line T2). It is possible to arrange several laser sources 3 (for example two laser sources 3 as in this embodiment).

The apparatus may comprise a conveying arrangement for advancing the arrangement 1 of electrodes in the advancement direction F. Such conveying arrangement may comprise, for example, a (closed-loop) continuous conveyor belt 4 on which the arrangement 1 of electrodes rests. The arrangement 1 of electrodes may be intermittently or continuously movable. In this latter case at least part of the laser arrangement may be provided (in addition to the cutting motion for executing the cutting lines T1 and T2) with a reciprocal motion so that, with forward motion, the cutting laser beam can follow the advancement of the belt 4 that conveys the arrangement 1 of electrodes during cutting, and, in the backward motion, it can return to a starting point, without cutting, so as to be positioned for subsequent cutting.

Using a laser arrangement of solid state type enables a particularly reduced HAZ ("heat affected zone") to be obtained with relatively high cutting speeds (for example about 600-700 mm/sec), with relatively complex cutting paths.

The cutting method disclosed above, owing to the execution of two cutting lines that meet with an intersecting direction that is transverse to the intersected cutting line, ensures effective cutting, in particular when cutting is not straight, thus avoiding for example the creation of zones of material that is not perfectly cut, which would lead to the formation of threads, fragments or burrs of material that remain attached to the cut edges with the consequence of not completely detaching the edges.

It has been further found that the cut edge is not wrinkled, improving the quality of the material of the product.

The invention claimed is:
1. A cutting method comprising:
   cutting with a laser arrangement at least one continuous sheet material of separator for electrodes;
   performing at least two distinct cutting lines in which a first cutting line is intersected by a second cutting line at an intersection point;
   providing an arrangement of a plurality of electrodes applied to said sheet material in a row one after the other in a longitudinal direction; and
   leaving a space between one electrode and the other to enable the sheet material to be cut in the space between the electrodes, wherein said first cutting line having at least an intermediate portion that extends in length with at least one component parallel to said longitudinal direction, and
wherein said intersection point being arranged in said intermediate portion, wherein said intermediate portion comprises a curve shaped in such a manner as to have, at at least one point, a tangent that is parallel to said longitudinal direction.

2. The method according to claim 1, wherein said continuous sheet material is bound laterally by a first longitudinal side and by a second longitudinal side opposite said first longitudinal side, making said first cutting line starting and ending on said first side and said second cutting line between said second side and said intersection point.

3. The method according to claim 1, wherein said first cutting line being intersected by said second cutting line with an intersection direction that is transverse to the first cutting line at said intersection point; wherein said second cutting line being made after said first cutting line at least at said intersection point, and wherein, at said intersection point, said first cutting line having a tangent with at least one component parallel to said longitudinal direction.

4. The method according to claim 1, wherein an intersection direction is perpendicular, or almost perpendicular, to said first cutting line in said intersection point.

5. The method according to claim 1, wherein said second cutting line continues beyond said intersection point to ensure detachment of the material at said intersection point.

6. The method according to claim 1, wherein said at least two cutting lines are made in a zone comprised between two non-rectangular electrodes applied to said continuous sheet material.

7. The method according to claim 6, comprising the step of coupling said electrodes with said continuous separator sheet material by lamination, said coupling step preceding said cutting step.

8. The method according to claim 7, wherein said sheet material comprises two, three or more superimposed films and wherein said cutting step comprises cutting said superimposed films in a cutting zone that comprises at least one air gap comprised between at least two superimposed films.

9. The method according to claim 1, wherein said sheet material comprises one or more layers of polymer sheets comprising combinations of polymers chosen from a group consisting of: polypropylene (PP), polyethylene (PE), polyvinylidene difluoride (PVDF), polyether ether ketone (PEEK).

10. The method according to claim 9, wherein said layers of polymer sheets are loaded with inorganic particles chosen from a group consisting of: aluminium oxide ($Al_2O_3$), silicon ($SiO_2$), titanium dioxide ($TiO_2$), calcium carbonate ($CaCO_3$).

11. The method according to claim 1, wherein said sheet material has a thickness comprised between 12 and 30 microns.

\* \* \* \* \*